(12) United States Patent
Masuda

(10) Patent No.: US 10,866,410 B2
(45) Date of Patent: Dec. 15, 2020

(54) IMAGE FORMING APPARATUS AND CONTROL METHOD OF IMAGE FORMING APPARATUS

(71) Applicants: KABUSHIKI KAISHA TOSHIBA, Tokyo (JP); TOSHIBA TEC KABUSHIKI KAISHA, Tokyo (JP)

(72) Inventor: Yoshihisa Masuda, Kanagawa (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 242 days.

(21) Appl. No.: 15/941,290

(22) Filed: Mar. 30, 2018

(65) Prior Publication Data

US 2019/0302448 A1    Oct. 3, 2019

(51) Int. Cl.
*G02B 26/12*    (2006.01)
*H04N 1/028*    (2006.01)
*G02B 27/09*    (2006.01)

(52) U.S. Cl.
CPC ......... *G02B 26/123* (2013.01); *G02B 26/124* (2013.01); *G02B 27/0977* (2013.01); *H04N 1/0282* (2013.01)

(58) Field of Classification Search
None
See application file for complete search history.

(56) References Cited

U.S. PATENT DOCUMENTS

| 5,774,249 A * | 6/1998 | Shiraishi ............. G02B 26/124 347/243 |
| 6,342,963 B1 * | 1/2002 | Yoshino ............. G02B 26/123 250/234 |
| 9,658,561 B2 | 5/2017 | Hasegawa |
| 2007/0187616 A1 * | 8/2007 | Burroughs ........... G02B 26/101 250/458.1 |
| 2007/0210245 A1 * | 9/2007 | Maeda ................. G02B 26/125 250/234 |
| 2010/0097678 A1 * | 4/2010 | Hajjar ..................... G01J 3/506 359/198.1 |

FOREIGN PATENT DOCUMENTS

JP      2002052755 A    2/2002

* cited by examiner

*Primary Examiner* — Jennifer D. Carruth
(74) *Attorney, Agent, or Firm* — Kim & Stewart LLP

(57) ABSTRACT

An image forming apparatus includes first and second light sensors positioned in a laser scanning system of at least one color, such that scanned light is detected by the first light sensor and then by the second light sensor and light sensing surfaces of the first and second light sensors are not parallel, and a control unit connected to the first and second light sensors and configured to determine a time difference in the timing of light detection by the first and second light sensors and to execute a color position shift operation upon determining that the time difference is greater than a first threshold value.

20 Claims, 13 Drawing Sheets

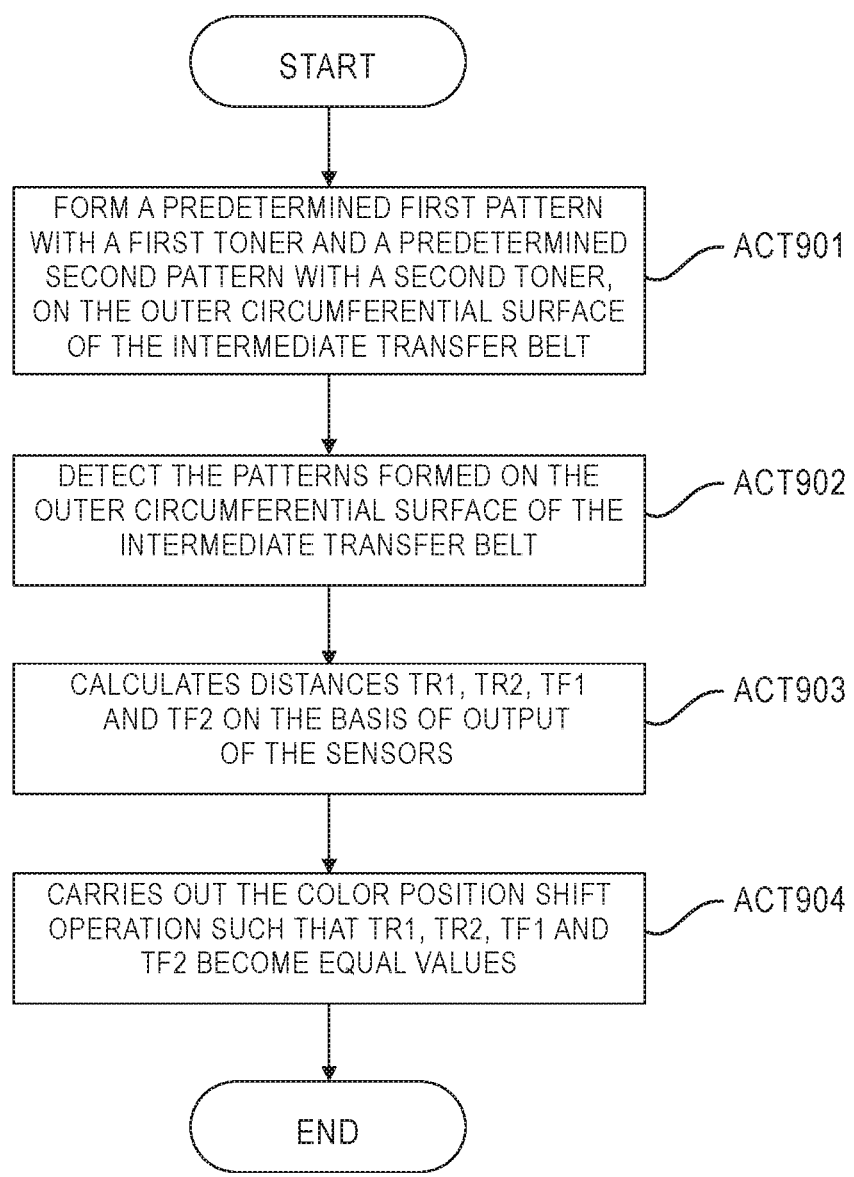

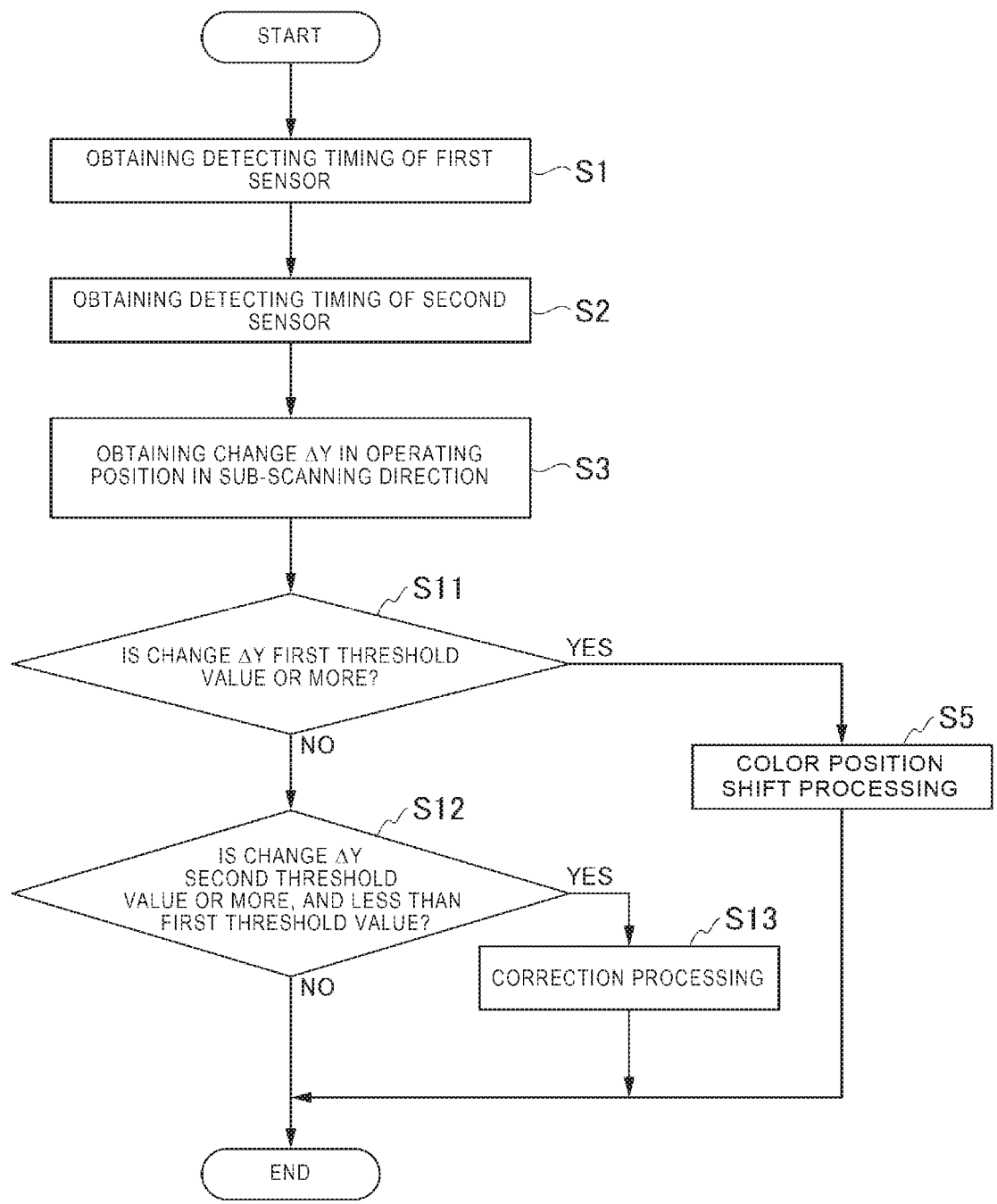

IMAGE FORMING APPARATUS AND CONTROL METHOD OF IMAGE FORMING APPARATUS

FIELD

Embodiments described herein relate generally to an image forming apparatus, and a control method of the image forming apparatus.

BACKGROUND

In the related art, in a laser exposure-type color multifunction peripheral (MFP), or a printer, a control method of performing an operation to shift a position of printing for each color (hereinafter referred to as "color position shift operation"), or the like, at a point of time in which a continuous printing output or an intermittent printing output passes a preset time, has been used. However, in the color position shift operation of the related art, there is a case in which a color position shift is too large as a result of temperature changes inside a laser scanning unit, caused by heat generation by a polygon mirror motor, or the like, especially when continuous printing is performed, or when the preset time is too long. In addition, in the color position shift operation of the related art, there is also a case in which, when the preset time is too short, color position shift operations are performed too frequently, and as a result, productivity of a printing output decreases, or the lifespan of a developer or a photoconductive drum decreases.

BRIEF DESCRIPTION OF THE DRAWINGS

FIG. 13 is a flowchart which illustrates steps of the color position shift operation.

FIG. 14 is a flowchart which illustrates steps carried out to determine whether to perform color position shift operation or the correction processing.

DETAILED DESCRIPTION

An image forming apparatus includes first and second light sensors positioned in a laser scanning system of at least one color, such that scanned light is detected by the first light sensor and then by the second light sensor and light sensing surfaces of the first and second light sensors are not parallel, and a control unit connected to the first and second light sensors and configured to determine a time difference in the timing of light detection by the first and second light sensors and to execute a color position shift operation upon determining that the time difference is greater than a first threshold value.

Hereinafter, an information processing device, an information processing system, and a control method of the information processing device according to an embodiment will be described with reference to drawings. In the following embodiment, a multifunction peripheral is depicted as an example of the information processing device.

Figure 1:
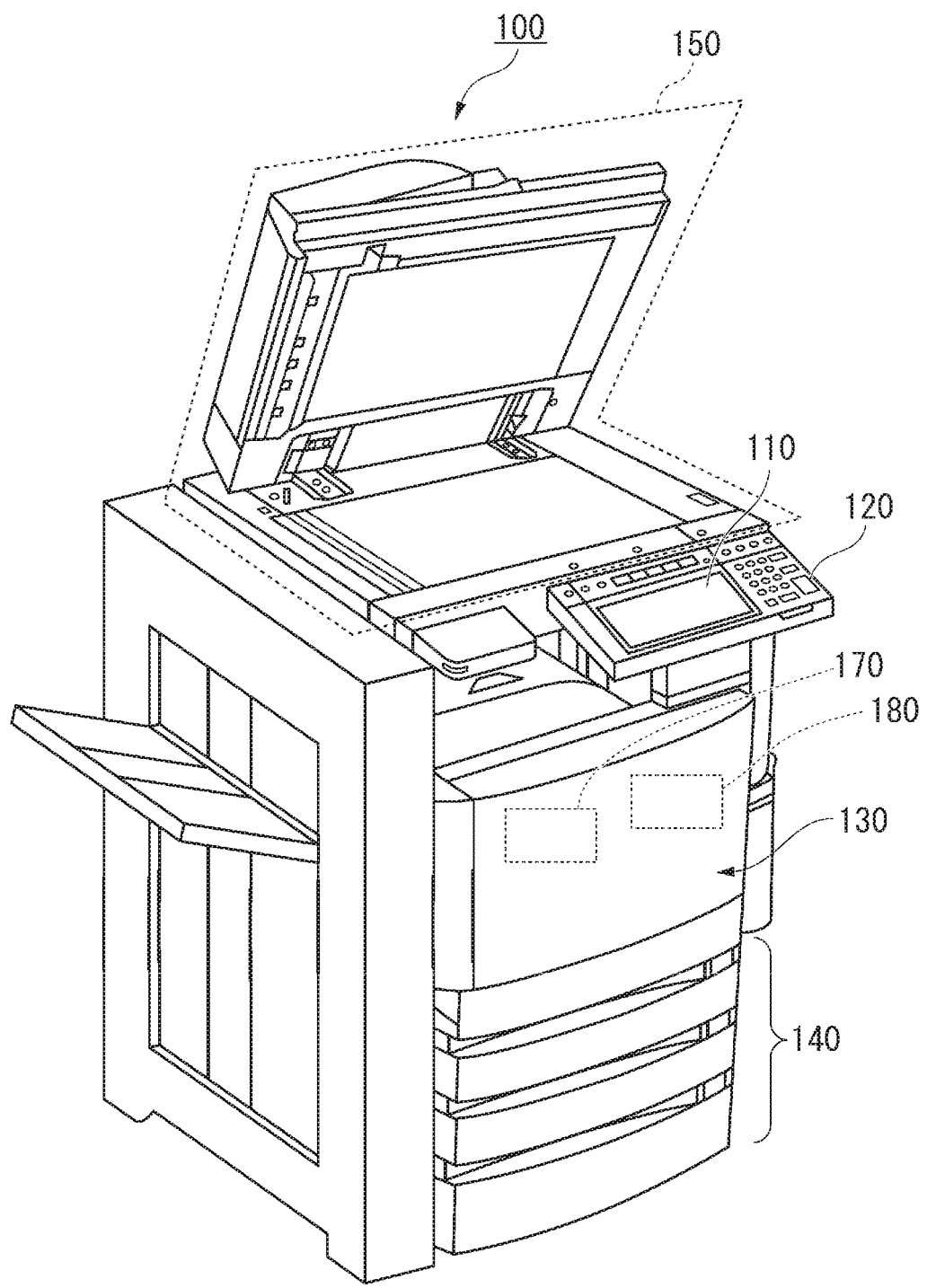
FIG. 1 is an external view of an information processing device according to an embodiment.

FIG. 1 is an external view of an information processing device 100 according to the embodiment.

As illustrated in FIG. 1, the information processing device 100 is a multifunction peripheral which can forma toner image on a sheet. The sheet is, for example, paper, or the like. The sheet may be any sheet on which the information processing device 100 can form an image.

Further, the information processing device 100 can read an image on a sheet. The sheet may be any sheet from which the information processing device 100 can read an image. The information processing device 100 generates digital data by reading an image illustrated on the sheet, and generates an image file.

The information processing device 100 is provided with a display 110, a control panel 120, a printing unit 130, a sheet accommodating unit 140, an image reading unit 150, a plurality of sensor units 160Y-160K (shown in FIG. 3), sensors 210, a control unit 170, and a storage unit 180. The printing unit 130 of the information processing device 100 may be a device which fixes a toner image onto a sheet. According to the embodiment, the printing unit 130 will be described as an example of a device which fixes a toner image.

The display 110 is an image display device such as a liquid crystal display, or an organic electroluminescence (EL) display. The display 110 displays various information related to the information processing device 100. In addition, the display 110 outputs a signal corresponding to an operation input performed by a user to the information processing device 100. The display 110 receives an operation of the user.

The control panel 120 includes a plurality of buttons. The control panel 120 receives an operation inputs by the user. The control panel 120 outputs a signal according to an operation performed by the user to the information processing device 100. The display 110 and the control panel 120 may be configured as an integrated touch panel.

The printing unit 130 executes image forming processing. In the image forming processing, the printing unit 130 forms an image on a sheet based on image information generated by the image reading unit 150, or image information received from outside of the device through a communicating path. In addition, as will be described later, the printing unit 130 includes a light source, a driving unit of the light source, a polygon mirror, a driving unit of the polygon mirror, or the like. In detail, the printing unit 130 includes, for example, four photoconductive drums (shown in FIG. 2), intermediate transfer belt ITB having an endless belt shape, four primary transfer rollers PTRY-PTRK (shown in FIG. 2). The primary transfer rollers PTRY-PTRK contact a surface of the intermediate transfer belt ITB. The four photoconductive drums (shown in FIG. 2) correspond to yellow color, magenta color, cyan color and black color respectively. The printing unit 130 forms toner image on each of the photoconductive drums respectively, transfers the toner image formed on the photoconductive drums onto the intermediate transfer belt ITB (to execute a primary transfer) in collaboration with the primary transfer rollers PTRY-PTRK, and then further transfer the toner image on the intermediate transfer belt ITB onto a sheet (to execute a secondary transfer).

The sheet accommodating unit 140 accommodates sheets which are subjected to the image forming by the printing unit 130.

The image reading unit 150 reads an image of a reading target as brightness and darkness of light. For example, the image reading unit 150 reads an image printed on a sheet set as a reading target. The image reading unit 150 records image data read from the reading target. The recorded image data may be transmitted to another information processing device through a network. The recorded image data may be formed as an image on a sheet using the printing unit 130.

Each of the plurality of sensor units 160Y-160K includes a pair of light detecting sensors, detects light radiated from the light source provided in the printing unit 130, and outputs the detection result to the control unit 170.

The sensors 210 acquire density values of a toner image formed on the surface of intermediate transfer belt ITB when carrying out the alignment processing. When visible images are formed on the intermediate transfer belt ITB, the sensors 210 acquire different density values. In one embodiment, the sensors 210 are arranged at front and rear sides of the intermediate transfer belt ITB, such that from the viewpoint of FIG. 2, the sensor 210 at the rear side is behind and obscured by the sensor 210 at the front side. The control unit 170 controls the information processing device 100 according to a control application program or setting stored in the storage unit 180. The control unit 170 performs a color position shift operation based on the detection result output by the sensor units 160Y-160K. Here, the color position shift operation is an operation to correct a shift in the printing position of each color which occurs due to a position shift, or the like, of scanning systems of optical systems of two or more colors, which are provided in the printing unit 130. The color position shift operation will be described later.

The control unit 170 includes a processor and a memory. The processor performs the operation of functional units described herein by executing programs or the like stored in the memory or the storage unit 180. The processor is, for example, a central processing unit (CPU). Alternatively, the functions of the control unit 170 can be realized by a control circuit, an ASIC, a programmed processor, and a combination thereof. The memory is, for example, volatile memory, non-volatile memory, or a combination thereof.

The storage unit 180 stores a control application program, setting, various threshold values, a scanning speed of the light source, and for each of the sensor units 160Y-160K, a time measurement representing an amount of time that elapses between light detections by the pair of light detecting sensors therein, and an angle θ formed by the pair of light detecting sensors. The storage unit 180 is, for example, a flash memory, a hard disk drive (HDD), or a solid state drive (SSD).

Figure 2:
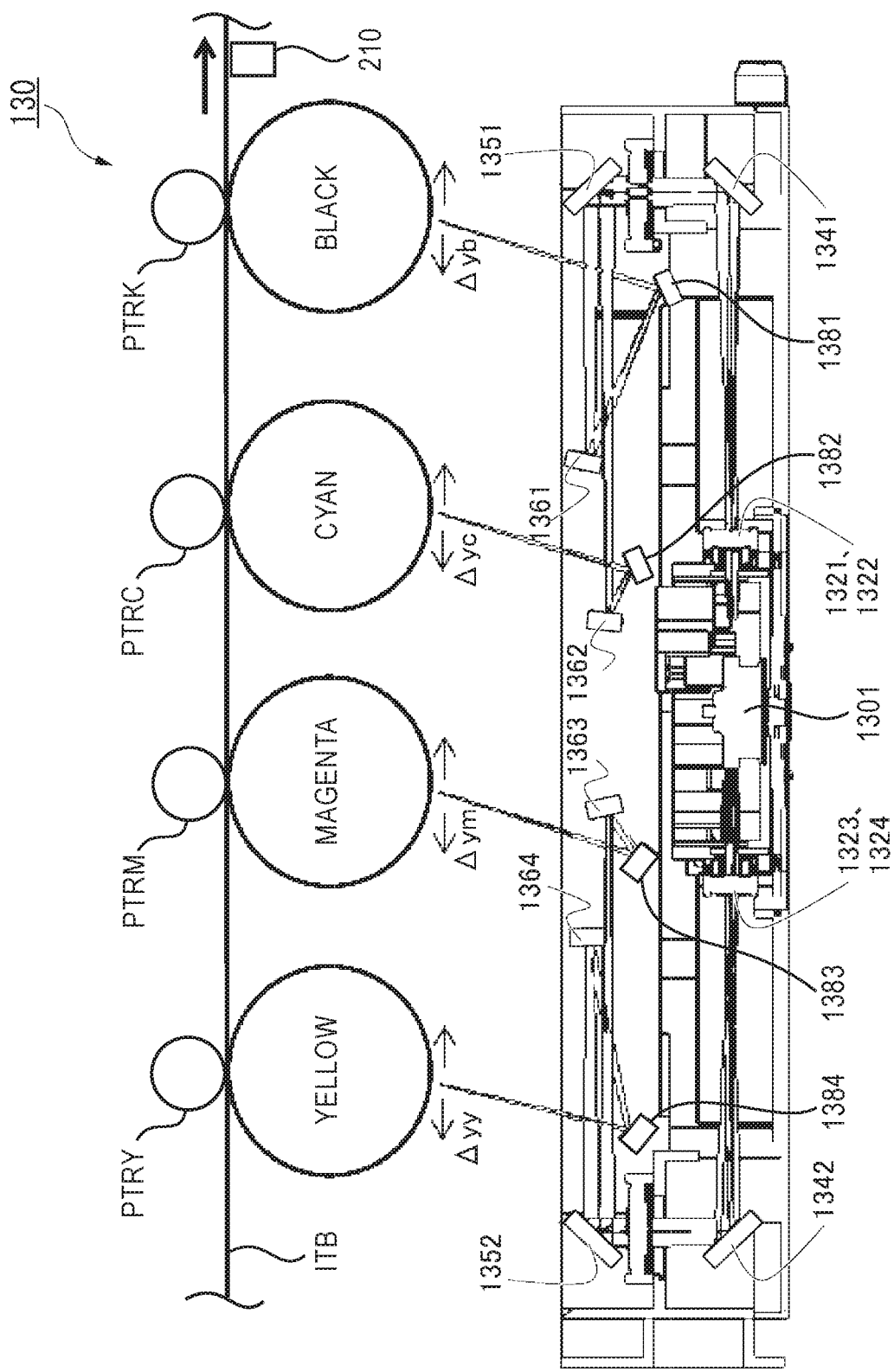
FIG. 2 is a diagram of a scanning system of a printing unit.
Figure 3:
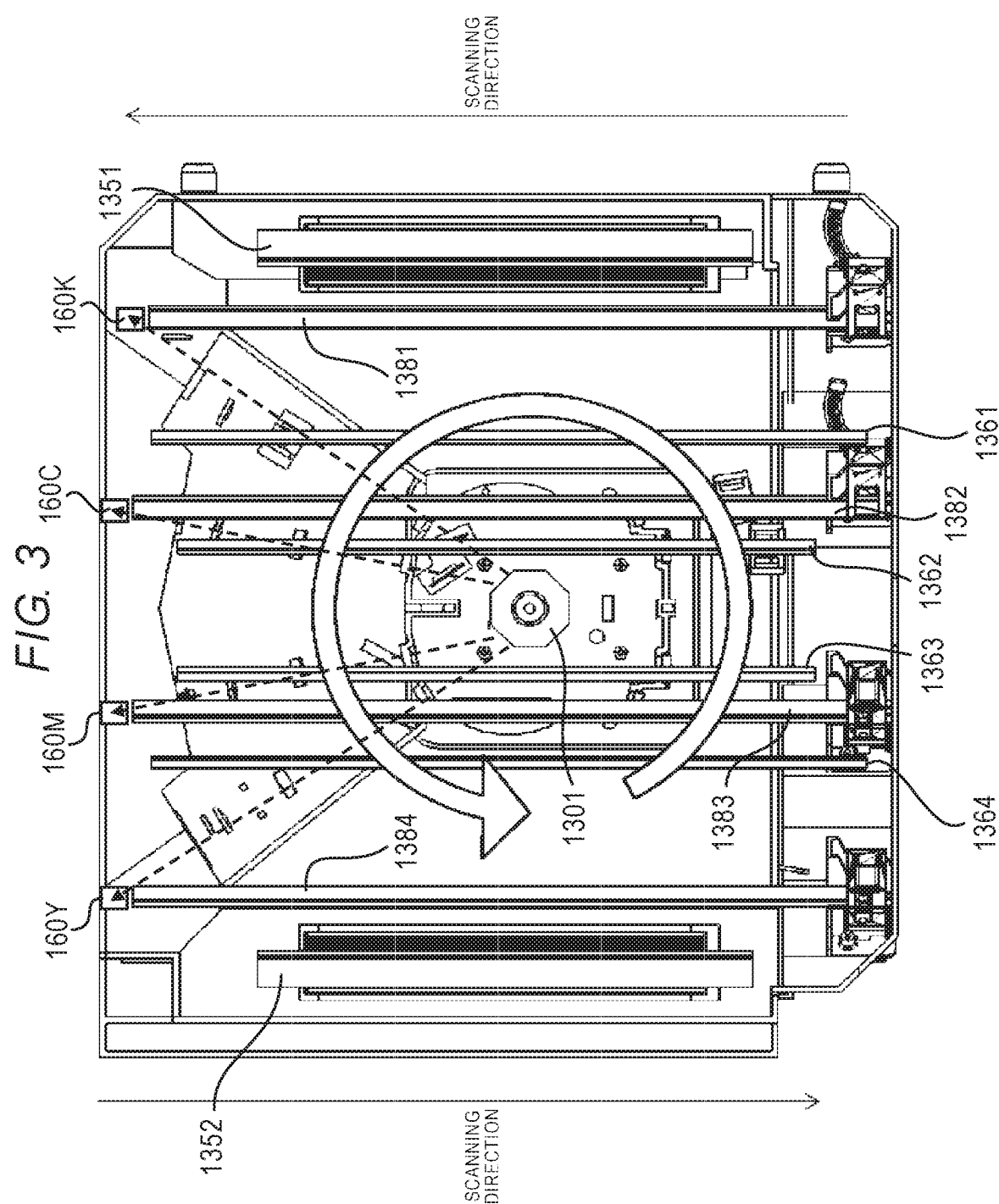
FIG. 3 is another diagram of the scanning system of the printing unit.

An example structure of the scanning system of the printing unit 130 will be described below, using FIGS. 2 and 3. FIG. 2 is a diagram which illustrates the structure of the scanning system of the printing unit 130 according to the embodiment. FIG. 3 is another diagram which illustrates the structure of the scanning system of the printing unit 130 according to the embodiment which is viewed from above.

As illustrated in FIG. 2, the scanning system of the printing unit 130 includes a first light source (not illustrated), an fθ lens 1321, a second light source (not illustrated), an fθ lens 1322, a third light source (not illustrated), a polygon mirror 1301, an fθ lens 1323, a fourth light source (not illustrated), an fθ lens 1324, reflection mirrors 1341, 1342, 1351, 1352, 1361, 1362, 1363, 1364, 1381, 1382, 1383 and 1384, and sensor units 160Y, 160M, 160C, and 160K. The sensor units 160Y, 160M, 160C, and 160K are positioned adjacent to the end of reflection mirrors 1381, 1382, 1383 and 1384 in the scanning direction, respectively, as shown in FIG. 3. The configuration of the embodiment is an example of including four light sources, and it is not limited to this. The light sources may be two or more. In addition, in the example illustrated in FIG. 3, the sensor unit is provided for each color; however, the sensor unit may be provided for just one color, e.g., the black color.

The respective first light source, second light source, third light source, and fourth light source are semiconductor lasers, for example. The first light source is a light source corresponding to black color, for example. The second light source is a light source corresponding to cyan color, for example. The third light source is a light source corresponding to magenta color, for example. The fourth light source is a light source corresponding to yellow color, for example.

The polygon mirror 1301 polarizes light beams which are input by rotating under a control of the control unit 170.

The reflection mirrors 1341 and 1351 reflect a light beam which is polarized by the polygon mirror 1301.

A light beam reflected by the mirror 1351 is input to the reflection mirror 1361, and then the reflection mirrors 1361 and 1381 guide the light beam toward a photoconductive drum for the black color. The sensor unit 160K is used for horizontal synchronization and a change in scanning position in the sub-scanning direction with respect to the light beam reflected by the reflection mirror 1381.

The light beam reflected by the reflection mirror 1351 is also input to the reflection mirror 1362, and then the reflection mirrors 1362 and 1382 guide the light beam toward a photoconductive drum for the cyan color. The sensor unit 160C is used for horizontal synchronization and a change in scanning position in the sub-scanning direction with respect to the light beam reflected by the reflection mirror 1382.

The reflection mirrors 1342 and 1352 reflect the light beam which is polarized by the polygon mirror 1301.

The light beam reflected by the reflection mirrors 1342 and 1352 is input to the reflection mirror 1363, and then the reflection mirrors 1363 and 1383 guide the light beam toward a photoconductive drum for the magenta color. The sensor unit 160M is used for horizontal synchronization and a change in scanning position in the sub-scanning direction with respect to the light beam reflected by the reflection mirror 1383.

The light beam reflected by the reflection mirrors 1342 and 1352 is input to the reflection mirror 1364, and then the reflection mirrors 1364 and 1384 guide the light beam toward a photoconductive drum for the yellow color. The sensor unit 160Y is used for horizontal synchronization and a change in scanning position in the sub-scanning direction with respect to the light beam reflected by the reflection mirror 1384.

Subsequently, a configuration example of a control system of the information processing device 100 according to the embodiment will be described.

Figure 4:
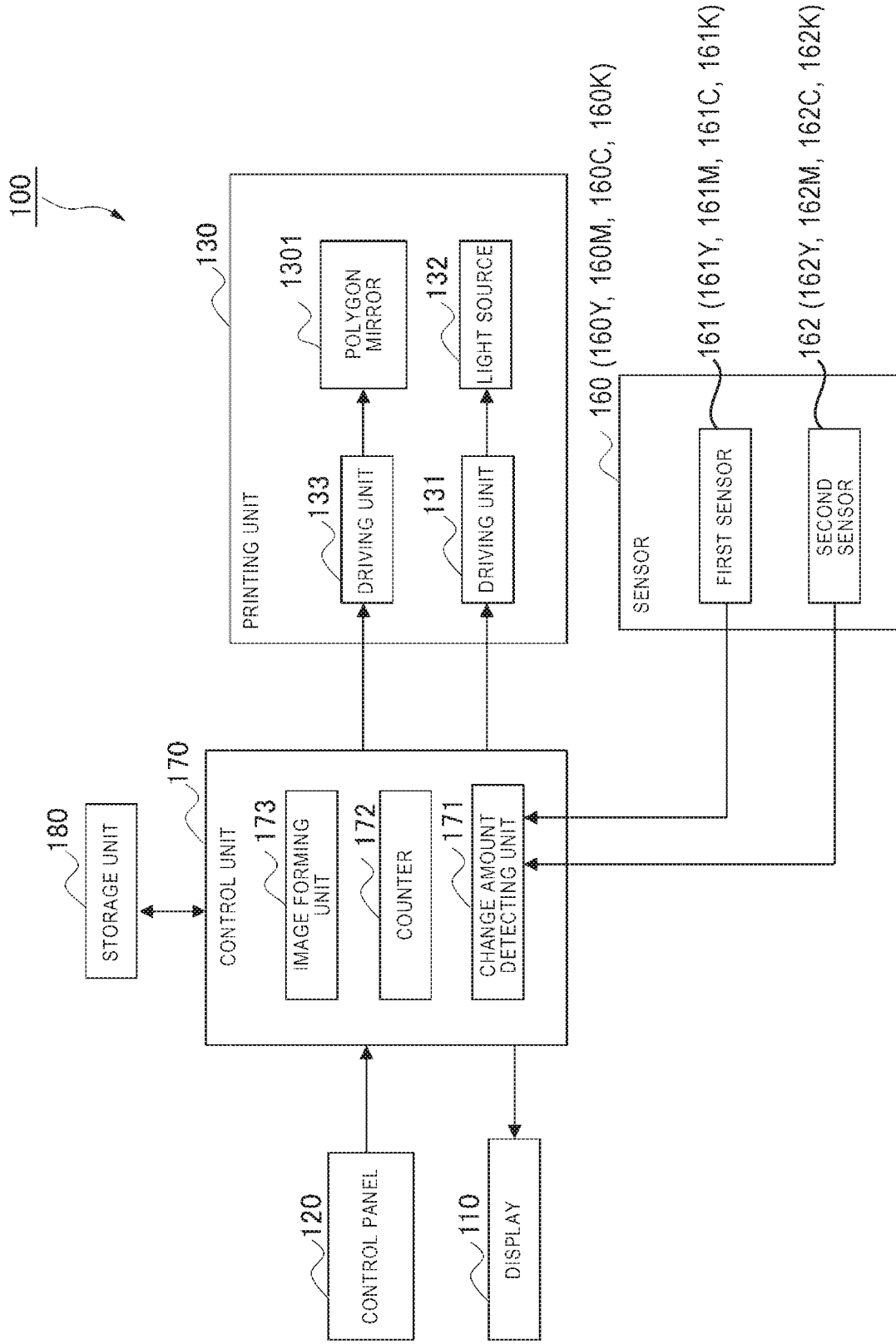
FIG. 4 is a block diagram of a control system of the information processing device.

FIG. 4 is a block diagram of hardware components of the control system of the information processing device 100 according to the embodiment. As illustrated in FIG. 4, the information processing device 100 is provided with the display 110, the control panel 120, the printing unit 130, the sensor unit 160Y-160K, the control unit 170, and the storage unit 180.

The printing unit 130 is provided with a driving unit 131, a light source 132, a driving unit 133, and a polygon mirror 1301.

The sensor unit 160Y for yellow color is provided with a first sensor 161Y (also referred to herein as a "first light detecting sensor"), and a second sensor 162Y (also referred to herein as a "second light detecting sensor"). The sensor unit 160M for magenta color is provided with a first sensor 161M, and a second sensor 162M. The sensor unit 160C for cyan color is provided with a first sensor 161C, and a second sensor 162C. The sensor unit 160K for black color is provided with a first sensor 161K, and a second sensor 162K. Hereinafter, reference numeral 160 is used for representing the sensor units 160Y-160K, reference numeral 161 is used for representing the first sensors 161Y-161K, and reference numeral 162 is used for representing the second sensors 162Y-162K.

The control unit 170 is configured to function as a change amount detecting unit 171, a counter 172, and an image forming unit 173.

In the example illustrated in FIG. 4, one light source in the plurality of light sources is illustrated by being extracted. The one light source is the first light source for black color (FIG. 2), for example.

The driving unit 131 drives the light source 132 according to a control of the control unit 170.

The driving unit 133 drives the polygon mirror 1301 according to a control of the control unit 170.

Each of the first sensors 161Y, 161M, 161C and 161K is used for horizontal synchronization, and outputs the detection result to the change amount detecting unit 171 of the control unit 170.

Each of the second sensors 161Y, 161M, 161C and 161K is configured to detect a change in scanning position in the sub-scanning direction with respect to the light beam, and outputs the detection result to the change amount detecting unit 171.

For example, in a case of black color, the change amount detecting unit 171 obtains a time difference between the detection of the light beam by the first sensor 161K and the detection of the light beam by the second sensor 162K. For example, the change amount detecting unit 171 obtains the time difference by causing the counter 172 to start counting when the first sensor 161K outputs the detection result, and counting a time until the second sensor 162K outputs the detection result. The change amount detecting unit 171 determines whether or not the time difference is large enough to require color position shift operation by comparing the obtained time difference with a predetermined threshold value stored in the storage unit 180. In addition, when information denoting a detected point of time (e.g., a time stamp) is included in the detection result output by the sensor 160K, the change amount detecting unit 171 may obtain the time difference from the detected point of time.

The counter 172 performs a start of counting, and ending of counting according to a control of the change amount detecting unit 171.

The image forming unit 173 performs image forming processing by controlling the printing unit 130. The image forming unit 173 causes the printing unit 130 to form an image according to a received instruction. The received instruction is, for example, position shift processing with respect to each color. The received instruction may be printing, copying, faxing, or the like, received from a user or a maintenance person.

Subsequently, an example of a location and an orientation of the sensor unit 160K will be described. The other sensor units 160Y, 160M and 160C have the same configuration as that of the sensor unit 160K.

Figure 5:
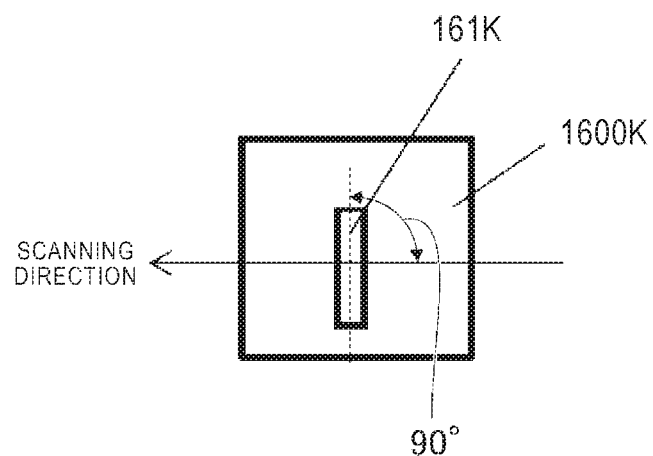
FIG. 5 is a diagram which illustrates an orientation of a first sensor used for horizontal synchronization.

FIG. 5 is a diagram which illustrates an example of a location and an orientation of the first sensor 161K included in the sensor unit 160K which is used for horizontal synchronization according to the embodiment. As illustrated in FIG. 5, the first sensor 161K which is used for horizontal synchronization is disposed so that the longitudinal direction of the first sensor 161K is orthogonal to the scanning direction on a substrate 1600K.

Figure 6:
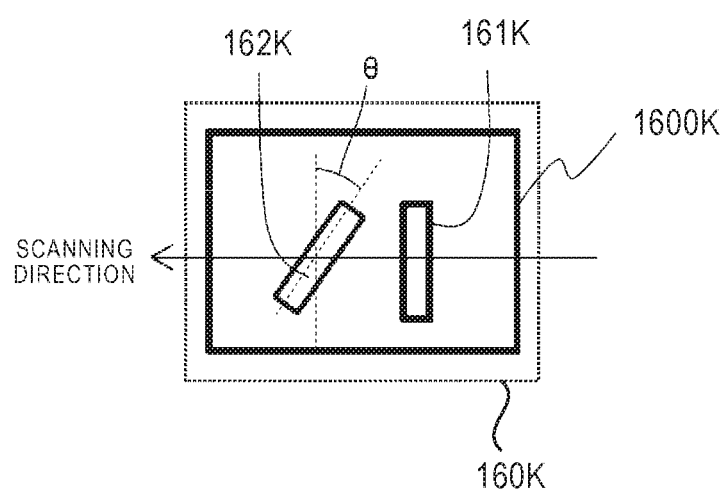
FIG. 6 is a diagram which illustrates an orientation of the first sensor and a second sensor which detects a change in scanning position.

FIG. 6 is a diagram which illustrates an example of a location and an orientation of the first sensor 161K and the second sensor 162K, which is configured to detect a change in scanning position according to the embodiment. As illustrated in FIG. 6, the second sensor 162K is disposed on the substrate 1600K at a predetermined angle which is different from the angle of the first sensor 161K, with respect to the scanning direction on the substrate 1600K. The predetermined angle is set to an angle θ with respect to the first sensor 161.

Figure 7:
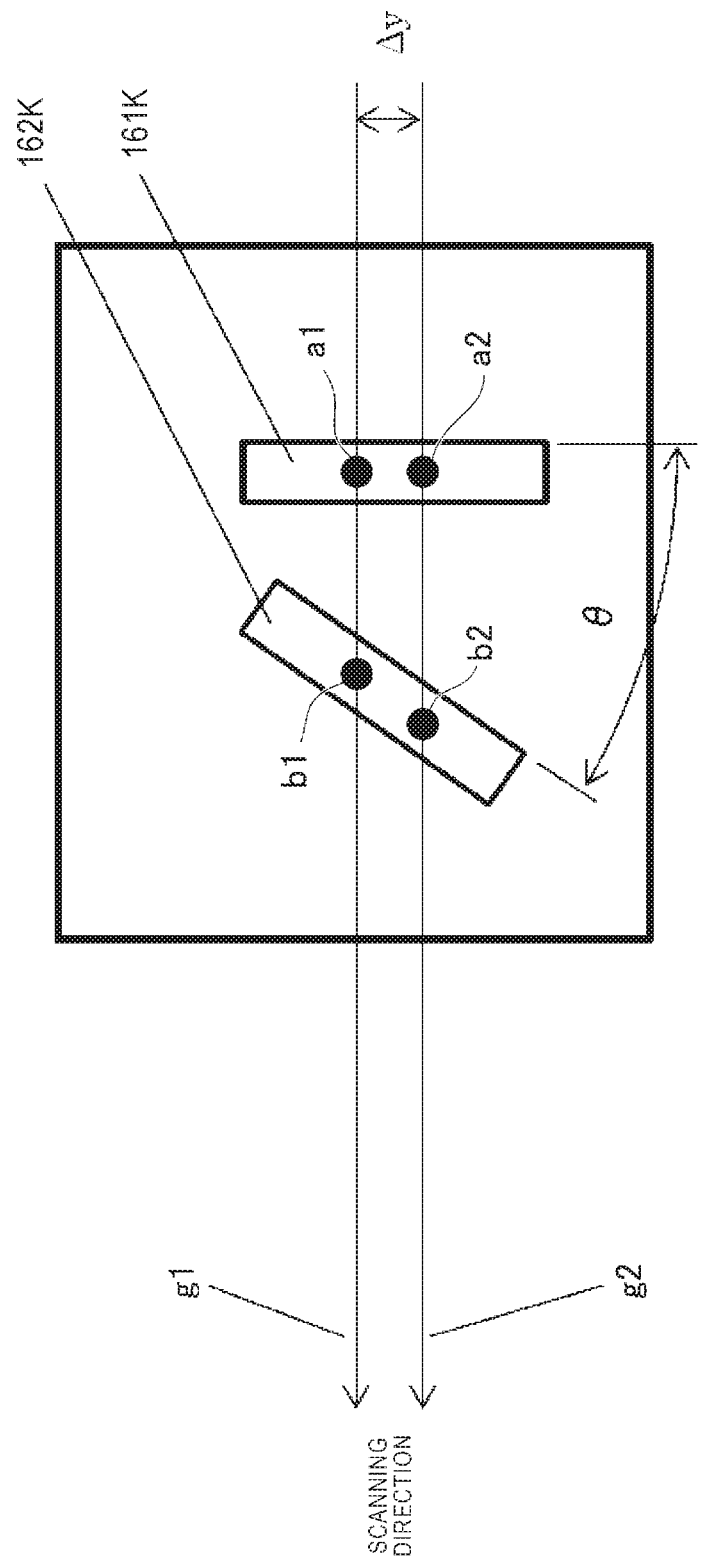
FIG. 7 is a diagram which describes a method of detecting a change in scanning position.

FIG. 7 is a diagram which describes a method of detecting a change in scanning position according to the embodiment.

In FIG. 7, the reference numeral g1 denotes a scanning position obtained from the most recent color position shift operation. In the case of the scanning position of the reference numeral g1, the position at which the light passes, as detected by the first sensor 161K is a1, and the position at which the light passes, as detected by the second sensor 162K is b1. A time difference between the detection of light at the position a1 and the detection of light at the position b1 is t1.

In addition, in FIG. 7, a reference numeral g2 denotes a scanning position that is shifted after a time has elapsed since the most recent completion of color position shift operation. In the case of the scanning position of the reference numeral g2, the position at which the light passes, as detected by the first sensor 161K is a2, and a position at which the light passes, as detected by the second sensor 162K is b2. A time difference between the detection of light at the position a2 and the detection of light at the position b2 is t2, which is larger than t1.

In addition, the distance between the detected positions of the light in the case of the reference numeral g1 and the detected positions of the light in the case of the reference numeral g2 (representing a shift in scanning position in the sub-scanning direction) is set to Δy [mm]. In addition, an angle between the first sensor 161K and the second sensor 162K is set to θ.

If a scanning speed (i.e., moving speed of the scanned light on the surface of the photoconductive drum) is set as $$\Delta y = \frac{v \cdot (t2 - t1)}{\tan \theta} \quad (1)$$

v [mm/s], the change in scanning position in the sub-scanning direction $\Delta y$ [mm] is expressed by equation (1).

By determining an allowable amount of the shift $\Delta y$ [mm], that is, an allowable shift amount, it is possible to determine an allowable change in the time difference between the detection of light at a position on one sensor and the detection of light at a position on the other sensor, that is, it is possible to determine a threshold value for the time difference. In addition, in FIG. 2, a horizontal direction with respect to a paper denotes a direction of the change $\Delta y$ [mm] ($\Delta yy$, $\Delta ym$, $\Delta yc$, and $\Delta yb$). In addition, the allowable amount of the change $\Delta y$ [mm] is less than 2 lines, for example. When a resolution is 600 dpi, one line is approximately 42 [μm].

The configurations of the first sensor 161K and the second sensor 162K illustrated in FIGS. 6 and 7 are examples, and they are not limited to these.

Figure 8:
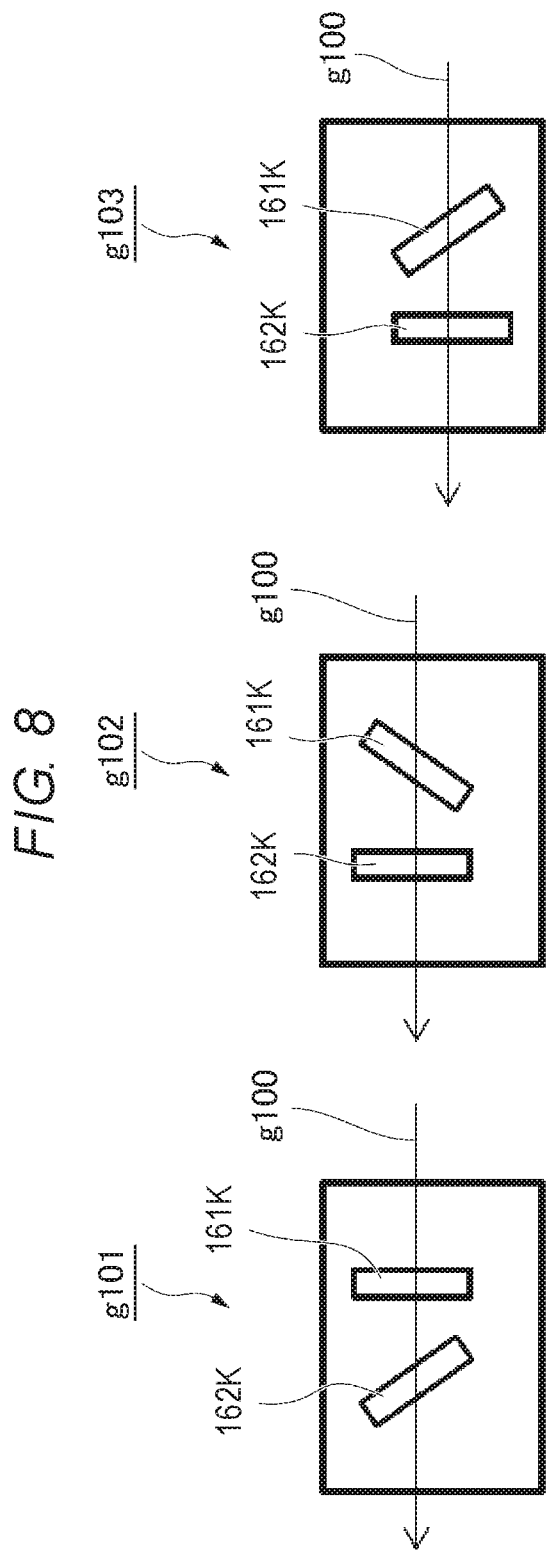
FIG. 8 is a diagram which illustrates another example of an orientation of the first sensor and the second sensor.

FIG. 8 is a diagram which illustrates another example of an orientation of the first sensor 161K and the second sensor 162K according to the embodiment. In FIG. 8, the direction of the arrow g100 denotes a scanning direction of the scanning light.

A diagram in a region denoted by a reference numeral g101 is an example in which the second sensor 162K is slightly rotated to the counterclockwise direction with respect to the first sensor 161K.

A diagram in a region denoted by a reference numeral g102 is an example in which the first sensor 161K is slightly rotated to the clockwise direction with respect to the second sensor 162K.

A diagram in a region denoted by a reference numeral g103 is an example in which the first sensor 161K is slightly rotated to the counterclockwise direction with respect to the second sensor 162K.

In the information processing device 100, the first sensor and the second sensor are provided in respective optical systems corresponding to each of the colors. Alternatively, in the information processing device 100, only the first sensor 161K and the second sensor 162K may be provided in the optical system for a color of which a use frequency is high, for example, black. Alternatively, in the information processing device 100, the first sensor and the second sensor may be provided in an optical system corresponding to at least one color that is not black. Alternatively, in the information processing device 100, one sensor unit may be disposed with respect to any one of optical systems of colors on both ends which are disposed in the sheet conveying direction. The colors on both ends in the sheet conveying direction are, for example, a yellow color or a black color in FIG. 2, in a case of four colors.

In the examples illustrated in FIGS. 5 to 7, the pair of sensors are disposed on one substrate, however, a sensor in which a light receiving unit corresponding to the pair of sensors is provided in one chip may be adopted. In addition, the pair of sensors may be provided on separate substrates.

In the examples illustrated in FIGS. 4 to 8, an example in which the sensor unit is provided as the pair of sensors is described, however, the number of the sensors for one sensor unit may be two or more. In this case, predetermined angles of at least two sensors with respect to the light scanning direction is different, that is, the angle formed by the two sensors is angle $\theta$.

In addition, an angle $\theta$ formed by the first sensor 161 and the second sensor 162, and the time difference t1 in an initial position of a scanning line may be stored in the storage unit 180 at a time of shipment, for example. In a case where the first sensor 161 and the second sensor 162 are provided in each of the light sources 132, the angle $\theta$ formed by the first sensor 161 and the second sensor 162, and the time difference t1 in an initial position of a scanning line may be stored for each of the light sources 132 in the storage unit 180 at a time of shipment, for example.

Subsequently, examples of signals of the first sensor 161 and the second sensor 162 at a scanning position after a time of the passage of light from recent execution of color position shift operation will be described.

Figure 9:
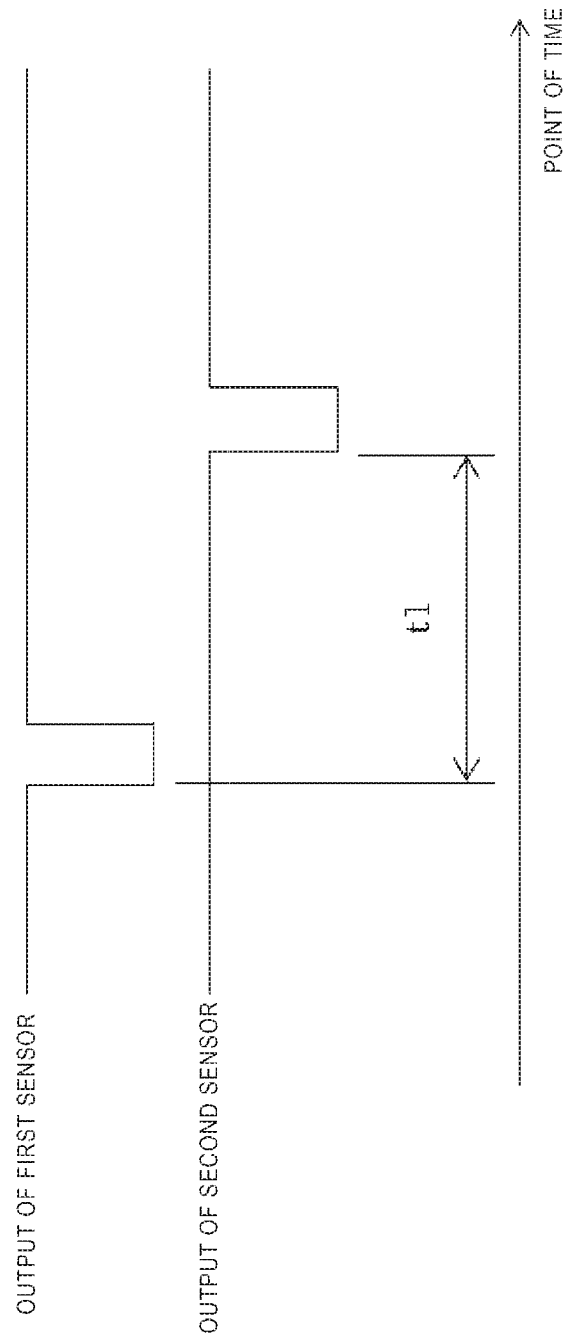
FIG. 9 is a timing diagram of signals of the first sensor and the second sensor in scanning positions right after the time color position shift operation was performed.

FIG. 9 is a timing diagram of signals of the first sensor 161 and the second sensor 162 at the scanning position after a passage of time from the most recent execution of the color position shift operation according to the embodiment. In FIG. 9, a horizontal axis denotes a time, and a vertical axis denotes a level of the signals.

As illustrated in FIG. 9, a time difference obtained right after the most recent prior execution of color position shift operation, between the detection of light by the first sensor 161 and the detection of light by the second sensor 162 is t1.

Subsequently, examples of signals of the first sensor 161 and the second sensor 162 at the scanning position after some passage of time will be described.

Figure 10:
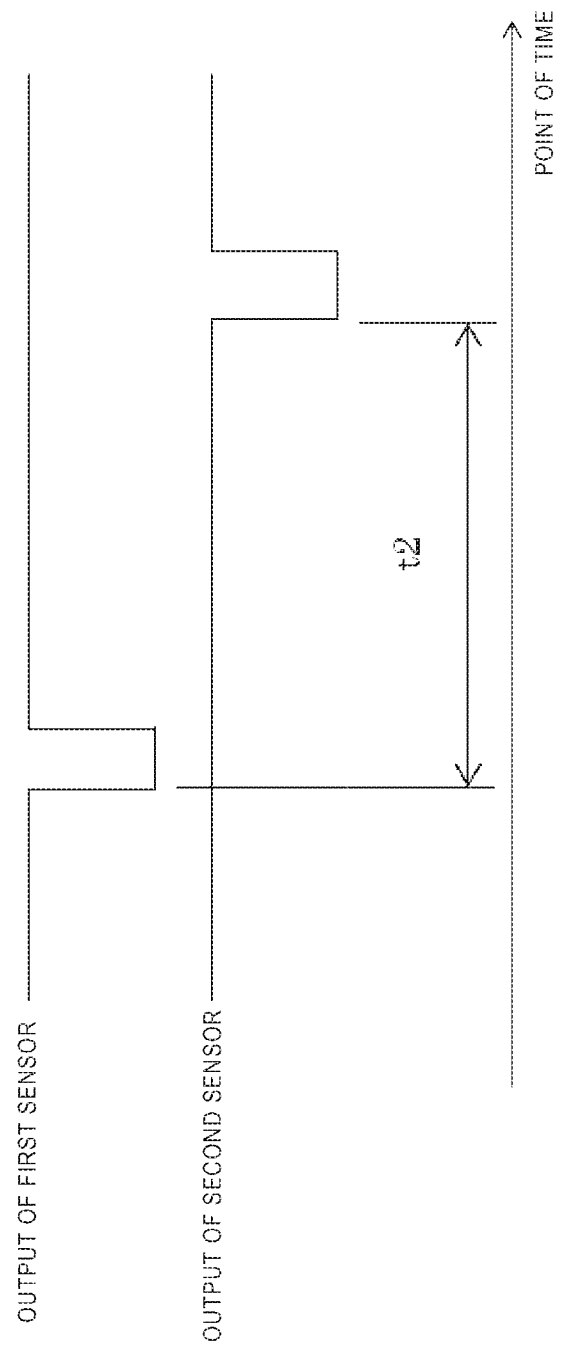
FIG. 10 is a timing diagram of signals of the first sensor and the second sensor in scanning positions after some passage of time from the time color position shift operation was performed.

FIG. 10 is a timing diagram of signals of the first sensor 161 and the second sensor 162 at the scanning position after some passage of time from a time the color position shift operation was most recently executed. In FIG. 10, a horizontal axis denotes a time, and a vertical axis denotes a level of the signals.

As illustrated in FIG. 10, a time difference between the timing of the detection of light by the first sensor 161 and the timing of the detection of light by the second sensor 162 is t2.

Subsequently, an example of procedure of processing which is performed by the control unit 170 will be described.

Figure 11:
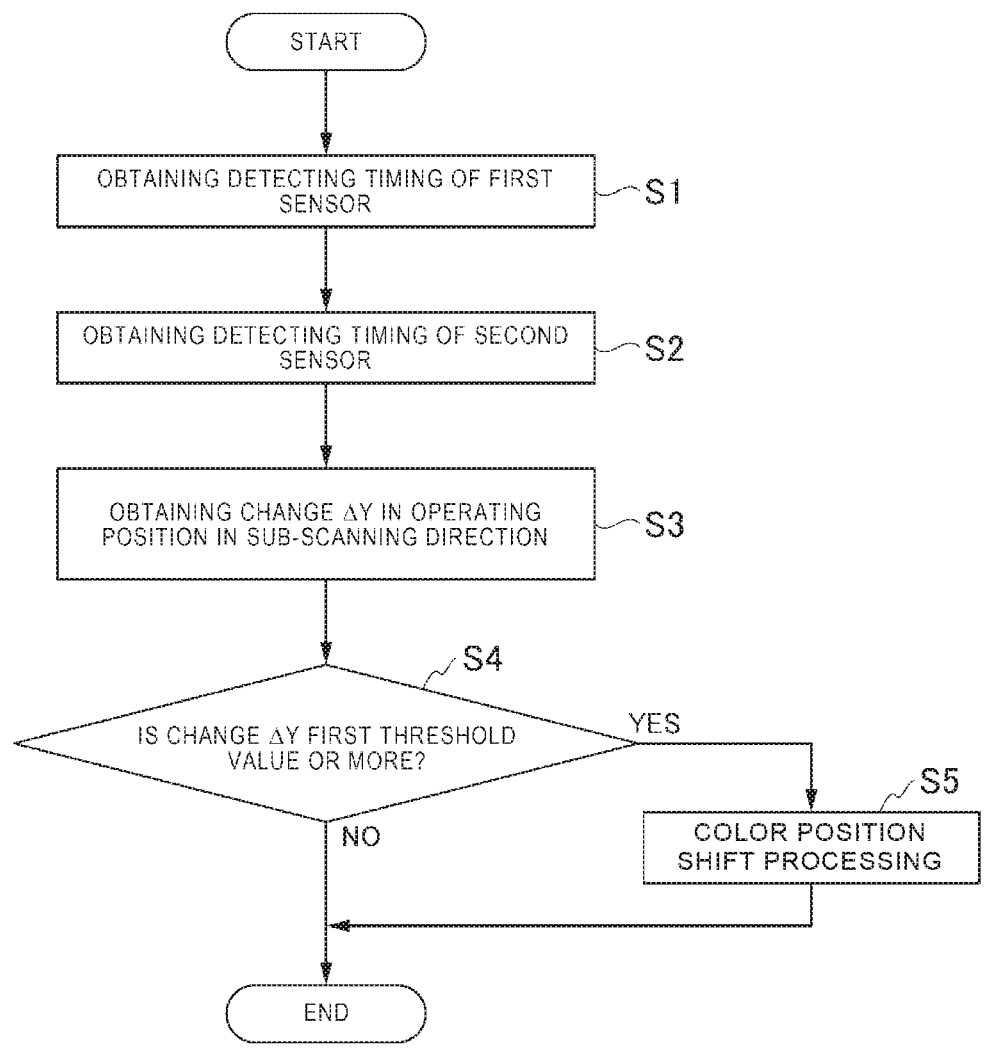
FIG. 11 is a flowchart which illustrates an example of power-on processing which checks for the need for color position shift operation according to an embodiment.

FIG. 11 is a flowchart which illustrates an example of power-on processing, which is carried out by the control unit 170 and checks for the need for color position shift operation according to the embodiment. In the example illustrated in FIG. 11, it is assumed that color position shift operation is performed when the information processing device 100 enters a power ON state from a power OFF state, and the measured time difference t1 between the detection of the light by the first sensor 161 and the detection of the light by the second sensor 162 is stored in the storage unit 180. In addition, it is assumed that the first sensor 161 is disposed so as to be perpendicular to the scanning direction, and the angle formed by the first sensor 161 and the second sensor 162 is $\theta$.

(ACT S1) The change amount detecting unit 171 starts counting at a falling timing at which a detection result is changed from an H (high) level to an L (low) level, when the first sensor 161 outputs the detection result.

(ACT S2) The change amount detecting unit 171 obtains the time difference t2 in the timing of detecting of light by the first sensor 161 and the second sensor 162 by ending counting at a falling timing at which the detection result is changed from the H level to the L level, when the second sensor 162 outputs the detection result.

(ACT S3) The change amount detecting unit 171 reads the time difference t1, the scanning speed v, the angle $\theta$ formed by the first sensor 161 and the second sensor 162. Subsequently, the change amount detecting unit 171 obtains the change $\Delta y$ in the scanning position in the sub-scanning direction by substituting the time difference t1, the scanning speed v, the angle $\theta$ which is formed, and the obtained time difference t2 which are read in the equation (1).

(ACT S4) The control unit 170 compares the change Δy in the scanning position in the sub-scanning direction which is calculated by the change amount detecting unit 171 with the first threshold value stored in the storage unit 180. Subsequently, the control unit 170 proceeds to processing in ACT S5 when the change Δy in the scanning position in the sub-scanning direction is equal to or more than the first threshold value (Yes in ACT S4). Alternatively, the control unit 170 ends the processing when the change Δy in the scanning position in the sub-scanning direction is less than the first threshold value (No in ACT S4).

(ACT S5) The control unit 170 performs the color position shift operation. The control unit 170 then ends the processing after the color position shift operation.

In addition, the control unit 170 performs processing from ACT S1 to ACT S5 after an elapse of a predetermined time (for example, one minute) and every printing ending time, after ending of printing of a predetermined number of sheets, at a predetermined point of time and at a time of ending printing, every time of printing one sheet, and the like.

Here, an example of color position shift operation will be described.

As illustrated in FIG. 4, a case in which the printing unit 130 includes the first light source to the fourth light source for four colors will be described as an example. When light sources of four colors are provided, the information processing device 100 is also provided with four optical systems such as mirrors. In addition, as illustrated in FIG. 2, mirrors are provided for each color. In printing, when printing of only a black color is frequently performed, a frequency of light emitting of the first light source for black color becomes high. Due to this, when a temperature of the optical system for black color becomes higher than the optical system of another color, a difference between the optical systems occurs in optical characteristics, and there is a case in which a shift occurs between the change Δy1 in the scanning position in the sub-scanning direction of the black color and the change Δy2 in the scanning position in the sub-scanning direction of another color.

Here, an example of the color position shift operation will be described.

A shift in printing position in each color is caused by any of the following:
I. A wavelength of light is shifted due to a temperature change.
II. A positioning component in the device is subjected to thermal expansion.
III. A distance between the optical element and the photoconductive drum changes, for example, as a result of an exchange of any part of the printing unit 130, or the like, of the photoconductive drum.

In such cases, the control unit 170 instructs the image forming unit 173 to form an image so that a distance at respective predetermined positions on the upstream side and the downstream side in the transport direction becomes the same as each other, for example. This technique is described in Japanese Patent Application No. 2017-084732.

In the related art, a control for the color position shift operation, or the like, is performed at a point of time when the total cumulative time for continuous or intermittent printing exceeds a preset maximum.

Figure 12:
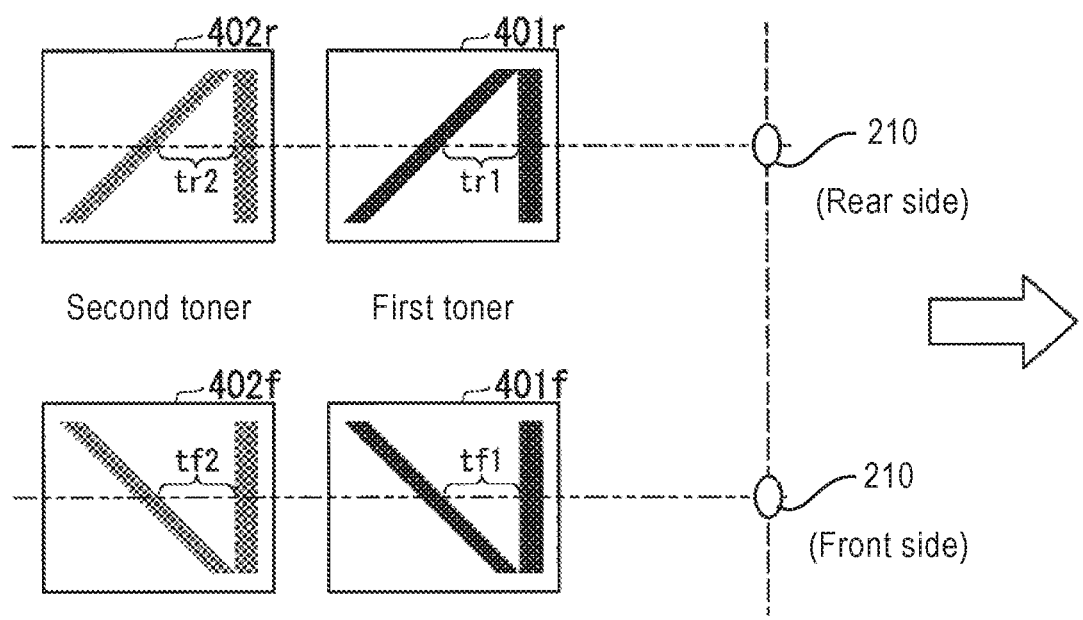
FIG. 12 is a conceptual diagram showing example patterns produced during the color position shift operation.

In the color position shift operation according to this embodiment, the control of color position shift operation is described with reference to FIG. 12. FIG. 13 is a flowchart which illustrates steps of the color position shift operation.

The control unit 170 causes the printing unit 130 to form a predetermined first pattern with a first toner (e.g., black toner) and a predetermined second pattern with a second toner different from the first toner (e.g., yellow toner), on the surface of the intermediate transfer belt ITB (ACT 901). The sensors 210 detect the patterns formed on the surface of the intermediate transfer belt ITB which passes through the sensors 210 (ACT 902). The control unit 170 calculates distances tr1 and tr2 on the basis of output of the sensor 210 at the rear side. Further, the control unit 170 calculates distances tf1 and tf2 on the basis of output of the sensor 210 at the front side (ACT 903). The printing unit 130 carries out the color position shift operation such that tr1, tr2, tf1 and tf2 become equal values by shifting an output timing of emission of the laser light from the light sources in the sub-scanning direction (ACT 904).

When the color position shift operation is executed at a point of time at which a preset time elapses, if the preset time is too long, there is a case in which a temperature change in the laser scanning unit becomes too large due to heat generation of the optical system such as a motor for rotating the polygon mirror, and a color position shift also becomes too large, especially when continuous printing is continued. In addition, in the related art, when the preset time is too short, there is a case in which a color position shift operation is too frequently executed, and productivity of a printing output decreases, or a lifespan of the developer or the photoconductive drum decreases.

According to the above described embodiment, two or more sensors of which angles are different with respect to the optical system of at least one color, and the change amount detecting unit 171 which detects a time difference in detecting timing of the sensors are provided. In this manner, according to the embodiment, since the color position shift operation is performed when a time difference in the timing of light detection by the two sensors has changed by a predetermined amount after the execution of the most recent color position shift operation, it is possible to correct for the color position shift at a more proper timing as compared to the related art. In addition, according to the embodiment, it is possible to suppress a decrease in productivity of a printing output, or a decrease in lifespan of the developer or the photoconductive drum.

In addition, in the example illustrated in FIG. 11, an example in which color position shift operation is performed when the change Δy in the scanning position in the sub-scanning direction is equal to or more than the threshold value is described; however, it is not limited to this. For example, when the change Δy in the scanning position in the sub-scanning direction is one line or more, and less than two lines, the control unit 170 performs a correction of color position shift rather than performing the color position shift operation.

FIG. 14 is a flowchart which illustrates steps carried out to determine whether to perform color position shift operation or the correction processing. In addition, description of the same processing given in FIG. 11 will be omitted by using the same reference numerals.

(ACT S1 to ACT S3) The change amount detecting unit 171 performs ACT S1 to ACT S3. The change amount detecting unit 171 proceeds to processing in ACT S11 after the processing.

(ACT S11) The control unit 170 compares the change Δy in the scanning position in the sub-scanning direction which is calculated by the change amount detecting unit 171 with the first threshold value stored in the storage unit 180. The first threshold value is a value of two lines, for example. Subsequently, when the change Δy in the scanning position in the sub-scanning direction is equal to or more than the first threshold value (Yes in ACT S11), the control unit 170 proceeds to processing in ACT S5. Alternatively, the control unit 170 proceeds to processing in ACT S12, when the change Δy in the scanning position in the sub-scanning direction is less than the first threshold value (No in ACT S11).

(ACT S12) The control unit 170 compares the change Δy in the scanning position in the sub-scanning direction which is calculated by the change amount detecting unit 171 with the second threshold value stored in the storage unit 180. The second threshold value is, for example, a distance between adjacent two scanning lines. Subsequently, the control unit 170 proceeds to the correction processing in ACT S13 when the change Δy in the scanning position in the sub-scanning direction is the second threshold value or more, and is less than the first threshold value (Yes in ACT S12). Alternatively, the control unit 170 ends the processing when the change Δy in the scanning position in the sub-scanning direction is less than the second threshold value (No in ACT S12).

(ACT S13) The control unit 170 performs correction processing. The control unit 170 ends the processing after the correction processing.

Here, an example of the correction processing will be described.

For example, it is assumed that the change Δy in the scanning position in the sub-scanning direction of a black color is the second threshold value or more, and less than the first threshold value.

The control unit 170 controls the driving unit 131 so as to advance or delay a driving timing of the first light source (FIG. 2) for black color, depending on whether a value of a shift of one line is a positive value or a negative value. The control unit 170 may advance or delay a driving timing, by performing a control of shifting a timing of a line buffer provided in the driving unit 131. The control unit 170 may shift a frequency of a clock signal of phase locked loop (PLL) which is used when controlling the printing unit 130 between printing and printing, and may perform a correction of one line of a horizontal synchronous timing at the printing start position, similarly.

The control unit 170 performs the correction processing by advancing or delaying a light emitting timing of the light source 132 in this manner.

In addition, the control unit 170 similarly controls the driving unit 131 so as to advance or delay the driving timing of the light source 132 depending on whether the value of the shift of one scanning line is a positive value or a negative value, when the change Δy in the scanning position in the sub-scanning direction of the light source 132 of another color is also the second threshold value or more, and less than the first threshold value. In addition, when the value of the shift is a positive value, it is a case of being shifted to the right direction with respect to the paper in FIG. 2, for example. When the value of the shift is a negative value, it is a case of being shifted to the left direction with respect to the paper in FIG. 2, for example.

According to the above described embodiment, two or more sensors of which angles are different with respect to the optical system of at least one color, and the change amount detecting unit 171 which obtains a time difference in the timing of detecting of light by the sensors, are provided. In this manner, according to the embodiment, since the color position shift operation is performed when a time difference between the light detection by the two sensors is changed by a predetermined amount since the most recent execution of the color position shift operation, it is possible to only correct the color position shift when the time difference changed by less than the predetermined amount.

In the above described each embodiment, an example in which the control unit 170 is a hardware functional portion is described; however, the control unit may be a functional portion which is executed, using software.

According to the above described at least one embodiment, it is possible to correct a color position shift by using two or more sensors of which orientations are different with respect to the optical system of at least one color, and the change amount detecting unit 171 which measures a time difference in the timing of detecting light by the sensors.

While certain embodiments have been described these embodiments have been presented by way of example only, and are not intended to limit the scope of the inventions. Indeed, the novel embodiments described herein may be embodied in a variety of other forms: furthermore various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. An image forming apparatus comprising:
   first and second light sensors positioned in a laser scanning system of at least one color, such that scanned light is detected by the first light sensor and then the scanned light that has passed the first light sensor is detected by the second light sensor and light sensing surfaces of the first and second light sensors are not parallel; and
   a control unit connected to the first and second light sensors and configured to determine a time difference in the timing of light detection by the first and second light sensors and to execute a color position shift operation upon determining that the time difference is greater than a first threshold value.

2. The apparatus according to claim 1,
   wherein the at least one color is a black color.

3. The apparatus according to claim 1, further comprising:
   a plurality of laser scanning systems of different colors arranged in a sheet transport direction, and the laser scanning system of the at least one color is the last laser scanning system in the sheet transport direction.

4. The apparatus according to claim 1, further comprising:
   a plurality of laser scanning systems of different colors arranged in a sheet transport direction, and the laser scanning system of the at least one color include the first and last laser scanning systems in the sheet transport direction.

5. The apparatus according to claim 1,
   wherein the control unit is configured to execute an operation of correcting a driving timing of a laser light source included in the laser scanning system, when the time difference is greater than a second threshold value and is less than the first threshold value.

6. The apparatus according to claim 1,
   wherein the light sensing surface of the first light sensor is perpendicular with respect to the scanned light and the light sensing surface of the second light sensor is at an oblique angle with respect to the scanned light.

7. The apparatus according to claim 1,
   wherein the light sensing surface of the second light sensor is perpendicular with respect to the scanned light and the light sensing surface of the first light sensor is at an oblique angle with respect to the scanned light.

8. An image forming apparatus comprising:
a plurality of laser scanning systems of different colors arranged in a sheet transport direction;
first and second light sensors positioned in one of the laser scanning systems, such that scanned light is detected by the first light sensor and then the scanned light that has passed the first light sensor is detected by the second light sensor and light sensing surfaces of the first and second light sensors are not parallel; and
a control unit connected to the first and second light sensors and configured to determine a time difference in the timing of light detection by the first and second light sensors and to execute a color position shift operation upon determining that the time difference is greater than a first threshold value.

9. The apparatus according to claim 8, wherein
the laser scanning systems include a first laser scanning system of a first color, a second laser scanning system of a second color, a third laser scanning system of a third color, and a fourth laser scanning system of a fourth color, and at least one color is a black color, and are arranged along the transport direction in the order of first, second, third, and fourth laser scanning systems, and
the first and second light sensors are arranged in the fourth laser scanning system.

10. The apparatus according to claim 9, wherein the first and second light sensors are also arranged in the first laser scanning system.

11. The apparatus according to claim 10, wherein the first color is yellow and the fourth color is black.

12. The apparatus according to claim 11,
wherein the control unit is configured to execute an operation of correcting a driving timing of a laser light source included in all four laser scanning systems, when the time difference is greater than a second threshold value and is less than the first threshold value.

13. The apparatus according to claim 8,
wherein the light sensing surface of the first light sensor is perpendicular with respect to the scanned light and the light sensing surface of the second light sensor is at an oblique angle with respect to the scanned light.

14. The apparatus according to claim 8,
wherein the light sensing surface of the second light sensor is perpendicular with respect to the scanned light and the light sensing surface of the first light sensor is at an oblique angle with respect to the scanned light.

15. A method of correcting a color position shift in image forming apparatus, said method comprising:
detecting scanned light with first and second light sensors having light sensing surfaces that are not parallel, wherein the first and second light sensors are positioned in a laser scanning system of at least one color, such that scanned light is detected by the first light sensor and then the scanned light that has passed the first light sensor is detected by the second light sensor;
determining a time difference in the timing of light detection by the first and second light sensors; and
executing a color position shift operation upon determining that the time difference is greater than a first threshold value.

16. The method according to claim 15, further comprising:
executing an operation of correcting a driving timing of a laser light source included in the laser scanning system, when the time difference is greater than a second threshold value and is less than the first threshold value.

17. The method according to claim 16, wherein the image forming apparatus includes a plurality of laser scanning systems of different colors, one of which is the laser scanning system of a black color in which the first and second light sensors are arranged.

18. The method according to claim 17, further comprising:
executing an operation of correcting a driving timing of a laser light source included in the other laser scanning systems, when the time difference is greater than the second threshold value and is less than the first threshold value.

19. The method according to claim 15,
wherein the light sensing surface of the first light sensor is perpendicular with respect to the scanned light and the light sensing surface of the second light sensor is at an oblique angle with respect to the scanned light.

20. The method according to claim 15,
wherein the light sensing surface of the second light sensor is perpendicular with respect to the scanned light and the light sensing surface of the first light sensor is at an oblique angle with respect to the scanned light.

* * * * *